(12) United States Patent
Matsumoto et al.

(10) Patent No.: US 11,307,044 B2
(45) Date of Patent: Apr. 19, 2022

(54) SERVER AND VEHICLE CONTROL SYSTEM

(71) Applicant: Hitachi, Ltd., Tokyo (JP)

(72) Inventors: Takashi Matsumoto, Tokyo (JP); Tsuneo Sobue, Tokyo (JP); Akihiro Kondo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 123 days.

(21) Appl. No.: 16/786,298

(22) Filed: Feb. 10, 2020

(65) Prior Publication Data

US 2020/0278212 A1 Sep. 3, 2020

(30) Foreign Application Priority Data

Feb. 28, 2019 (JP) .............................. JP2019-036559

(51) Int. Cl.
*G01C 21/34* (2006.01)
*H04W 4/48* (2018.01)
(Continued)

(52) U.S. Cl.
CPC ..... *G01C 21/3476* (2013.01); *G01C 21/3614* (2013.01); *G01C 21/3644* (2013.01); *H04W 4/44* (2018.02); *H04W 4/48* (2018.02)

(58) Field of Classification Search
CPC ............ G01C 21/3476; G01C 21/3614; G01C 21/3644; H04W 4/48; H04W 4/44
See application file for complete search history.

(56) References Cited

U.S. PATENT DOCUMENTS

2008/0243390 A1\* 10/2008 Nakamori .............. G06V 20/58
382/104
2010/0070167 A1 3/2010 Mudalige
(Continued)

FOREIGN PATENT DOCUMENTS

CN 101673471 A 3/2010
CN 106233353 A 12/2016
(Continued)

OTHER PUBLICATIONS

Extended European Search Report issued in European Application No. 20159831.5 dated Jul. 20, 2020 (nine (9) pages).
(Continued)

*Primary Examiner* — Peter D Nolan
*Assistant Examiner* — Wae L Louie
(74) *Attorney, Agent, or Firm* — Crowell & Moring LLP

(57) ABSTRACT

The server includes an infrastructure cooperation section determination unit that determines an infrastructure cooperation section indicating a range in which an in-vehicle device performs a cooperative operation with an infrastructure sensor and performs traveling support of the host vehicle, and transmits cooperative operation information for the in-vehicle device to start or stop the cooperative operation with the infrastructure sensor to the in-vehicle device based on the infrastructure cooperation section determined by the infrastructure cooperation section determination unit. The in-vehicle device sets or cancels the cooperative operation mode by the mode setting unit based on the cooperative operation information transmitted from the server.

19 Claims, 9 Drawing Sheets

(51) Int. Cl.
*H04W 4/44* (2018.01)
*G01C 21/36* (2006.01)

(56) References Cited

U.S. PATENT DOCUMENTS

| | | | |
|---|---|---|---|
| 2011/0130894 A1* | 6/2011 | Kim | G08G 1/096844 |
| | | | 701/2 |
| 2017/0085437 A1* | 3/2017 | Condeixa | H04L 43/06 |
| 2017/0190331 A1* | 7/2017 | Gupta | B60Q 1/346 |
| 2017/0243484 A1* | 8/2017 | Li | G08G 1/0145 |
| 2017/0270787 A1* | 9/2017 | Menard | G08B 25/10 |
| 2017/0327082 A1* | 11/2017 | Kamhi | B60H 1/00357 |
| 2018/0336780 A1* | 11/2018 | Ran | G08G 1/07 |
| 2018/0364700 A1* | 12/2018 | Liu | G05D 1/0027 |
| 2018/0364702 A1* | 12/2018 | Liu | G05D 1/0055 |
| 2020/0278212 A1* | 9/2020 | Matsumoto | H04W 4/44 |

FOREIGN PATENT DOCUMENTS

| | | |
|---|---|---|
| CN | 106507449 A | 3/2017 |
| EP | 3 349 514 A1 | 7/2018 |
| JP | 2008-242844 A | 10/2008 |

OTHER PUBLICATIONS

Chinese-language Office Action issued in Chinese Application No. 202010050349.1 dated Oct. 9, 2021 with English translation (22 pages).

\* cited by examiner

SERVER AND VEHICLE CONTROL SYSTEM

BACKGROUND OF THE INVENTION

1. Field of the Invention

The present invention relates to a server and a vehicle control system.

2. Description of the Related Art

Conventionally, a technique for collecting information from sensors mounted on roadside devices installed on the road (hereinafter referred to as infrastructure sensors) in addition to sensors such as radar devices mounted on vehicles (hereinafter referred to as in-vehicle sensors) and performing vehicle traveling support using such sensor information is proposed. For example, JP 2008-242844 A discloses a traveling support in-vehicle device which receives, from the outside of a host vehicle, external information including position information of at least one object of other vehicles that are present in the vicinity of the host vehicle and pedestrians and supports traveling of the host vehicle using the received external information, the traveling support in-vehicle device including: an autonomous system detector that is mounted on the host vehicle and detects at least one object of other vehicles visible from the host vehicle and pedestrians, a controller that performs control to adjust at least one of a detection range and its targeting of the autonomous system detector using the position information of the object included in the external information, an object detection determination unit for determining whether or not an object is detected by the autonomous system detector of which at least one of the detection range and its targeting is adjusted by the controller, a risk determination unit that performs, when the object detection determination unit determines that an object is detected, risk determination of the host vehicle with respect to the object, and a traveling support unit that performs traveling support corresponding to the determination result of the risk determination unit.

SUMMARY OF THE INVENTION

The technique of JP 2008-242844 A detects other vehicles and pedestrians on the assumption that external information (infrastructure information) can be received in the vehicle, and performs vehicle traveling support corresponding to the detection result. However, infrastructure sensors are not always installed in the vicinity of all points where the vehicle travels, and external information (infrastructure information) may not be received depending on the installation state of the infrastructure sensors. For this reason, it has been difficult to appropriately perform vehicle traveling support according to the installation state of the infrastructure sensor.

A server according to the first aspect of the present invention is the one that performs control related to traveling support of a vehicle, the server including: an infrastructure management unit that holds infrastructure management information including a position and a sensing range of an infrastructure sensor that generates sensing information outside the vehicle; and an infrastructure cooperation section determination unit that determines an infrastructure cooperation section indicating a range in which an in-vehicle device mounted on the vehicle performs a cooperative operation with the infrastructure sensor and performs traveling support of the vehicle based on the infrastructure management information held by the infrastructure management unit, in which the server transmits cooperative operation information for the in-vehicle device to start or stop the cooperative operation with the infrastructure sensor to the in-vehicle device based on the infrastructure cooperation section determined by the infrastructure cooperation section determination unit.

A vehicle control system according to the second aspect of the present invention includes a server that performs control related to traveling support of a vehicle; an in-vehicle device mounted on the vehicle; and an infrastructure sensor capable of generating sensing information outside the vehicle, in which the server includes: an infrastructure management unit that holds infrastructure management information including a position and a sensing range of an infrastructure sensor; and an infrastructure cooperation section determination unit that determines an infrastructure cooperation section indicating a range in which the in-vehicle device performs a cooperative operation with the infrastructure sensor and performs traveling support of the vehicle based on the infrastructure management information held by the infrastructure management unit, the infrastructure sensor includes: an infrastructure position acquisition unit that acquires a position of the infrastructure sensor; a sensor unit that generates sensing information within the sensing range based on the position of the infrastructure sensor; an infrastructure-side server cooperation unit that transmits information representing the position and the sensing range of the infrastructure sensor to the server; and an infrastructure-side vehicle cooperation unit that transmits the sensing information generated by the sensor unit to the in-vehicle device, the in-vehicle device includes: a mode setting unit that sets or cancels a cooperative operation mode for performing a cooperative operation with the infrastructure sensor; a vehicle-side infrastructure cooperation unit that acquires the sensing information transmitted from the infrastructure sensor when the cooperative operation mode is set; a determination unit that determines an operation of the vehicle using the sensing information acquired by the vehicle-side infrastructure cooperation unit; and a vehicle controller that controls the vehicle based on a determination result of the operation of the vehicle by the determination unit, the server transmits cooperative operation information for the in-vehicle device to start or stop cooperative operation with the infrastructure sensor to the in-vehicle device based on the infrastructure cooperation section determined by the infrastructure cooperation section determination unit, and the in-vehicle device sets or cancels the cooperative operation mode by the mode setting unit based on the cooperative operation information transmitted from the server.

According to this invention, the traveling support of a vehicle can be performed appropriately according to the installation state of an infrastructure sensor.

DESCRIPTION OF THE PREFERRED EMBODIMENTS

First Embodiment

Figure 1:
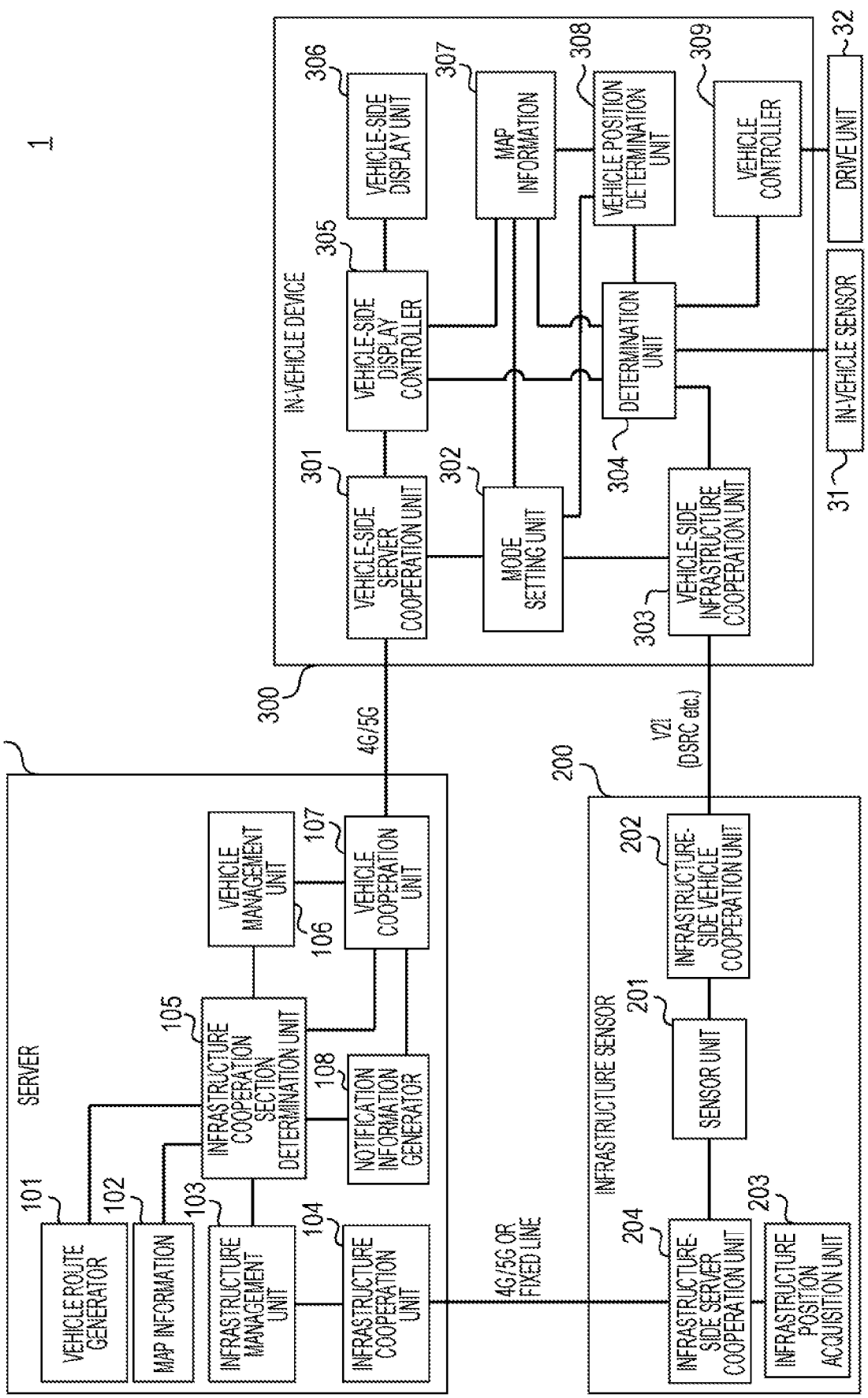
FIG. 1 is a diagram showing a configuration of a vehicle control system according to a first embodiment of the present invention.

FIG. 1 is a diagram showing a configuration of a vehicle control system according to the first embodiment of the present invention. A vehicle control system 1 shown in FIG. 1 includes a server 100, an infrastructure sensor 200, and an in-vehicle device 300, and performs traveling support such as avoidance of collision with an obstacle for a vehicle in which the in-vehicle device 300 is mounted. In the following, a vehicle as an execution target of traveling support by the vehicle control system 1, that is, a vehicle on which the in-vehicle device 300 is mounted is referred to as a "host vehicle".

The server 100 is an information device that performs control related to traveling support of the host vehicle, and is installed in a predetermined facility such as an information center, for example. The server 100 includes respective function blocks of a vehicle route generator 101, map information 102, an infrastructure management unit 103, an infrastructure cooperation unit 104, an infrastructure cooperation section determination unit 105, a vehicle management unit 106, a vehicle cooperation unit 107, and a notification information generator 108. The server 100 has a hardware configuration including a CPU, a memory, and a storage (HDD, SSD, etc.) (not shown), and can realize the above-described respective function blocks by executing predetermined programs using these hardware.

The infrastructure sensor 200 is installed, for example, in the vicinity of a road on which the host vehicle travels, and detects various obstacles that exist on the road and hinder the passage of the host vehicle outside the host vehicle. Although only one infrastructure sensor 200 is illustrated in FIG. 1, it is preferable that a large number of infrastructure sensors 200 are actually installed at predetermined intervals along the road. The infrastructure sensor 200 includes respective function blocks of a sensor unit 201, an infrastructure-side vehicle cooperation unit 202, an infrastructure position acquisition unit 203, and an infrastructure-side server cooperation unit 204.

The in-vehicle device 300 is mounted on the host vehicle, and performs control necessary for traveling support of the host vehicle using information provided from the server 100 and the infrastructure sensor 200. In FIG. 1, only one in-vehicle device 300 is shown, but actually, a large number of vehicles are mounted with the in-vehicle devices 300 respectively, and each in-vehicle device 300 together with the server 100 and the infrastructure sensor 200 preferably constitutes a vehicle control system 1. The in-vehicle device 300 includes respective function blocks of a vehicle-side server cooperation unit 301, a mode setting unit 302, a vehicle-side infrastructure cooperation unit 303, a determination unit 304, a vehicle-side display controller 305, a vehicle-side display unit 306, map information 307, a vehicle position determination unit 308, and a vehicle controller 309.

Next, the respective function blocks of the server 100, the infrastructure sensor 200, and the in-vehicle device 300 will be described below.

In the server 100, the vehicle route generator 101 uses the map information 102 to generate a route that the host vehicle should travel. For example, by acquiring the current position of the host vehicle from the in-vehicle device 300 and searching for a route from the acquired current position to a preset destination based on the map information 102, the route of the host vehicle can be generated. When the route of the host vehicle is set in the in-vehicle device 300, the route information may be acquired from the in-vehicle device 300.

The map information 102 is information representing road maps in various places of the country, and is stored in a storage such as an HDD or an SSD in the server 100. The map information 102 expresses a road map of each place by combining a node representing a specific point on the road such as an intersection or a branch point and a link representing a road section connecting the nodes.

The infrastructure management unit 103 holds infrastructure management information that represents the characteristics of each infrastructure sensor 200. The infrastructure management information includes at least the position and the sensing range of each infrastructure sensor 200. In the infrastructure management information, the position of the infrastructure sensor 200 may be expressed by coordinate values such as latitude and longitude, or may be expressed by combining a node ID and a link ID. The node ID and link ID are information uniquely assigned to each node or link in the map information 102, and by using these, the position on the road where the infrastructure sensor 200 is installed can be identified to some extent. The sensing range of the infrastructure sensor 200 represents a range in which the sensor unit 201 can detect an obstacle in the infrastructure sensor 200, and is represented by, for example, a radius of a circle centering on the position of the infrastructure sensor 200. However, when the sensing range is not circular, it is preferable to use an expression format that matches the shape. For example, the information on the sensing range of the infrastructure sensor 200 in any expression format, such as the radius, center orientation and center angle (in the case of a sector), and coordinate values of each vertex (in the case of a polygon), can be held in the infrastructure management unit 103 as infrastructure management information, together with the position information of the infrastructure sensor 200.

The infrastructure cooperation unit 104 has a communication function with the infrastructure sensor 200, receives information transmitted from the infrastructure sensor 200, and transmits information to the infrastructure sensor 200. The infrastructure cooperation unit 104 can communicate with the infrastructure sensor 200 using, for example, a mobile communication network (4G, 5G) or a fixed line.

The infrastructure cooperation section determination unit 105 determines an infrastructure cooperation section in which the in-vehicle device 300 performs a cooperative operation with the infrastructure sensor 200 and performs traveling support of the host vehicle, and notifies the in-vehicle device 300 of the infrastructure cooperation section. Based on the determined infrastructure cooperation section, the infrastructure cooperation section determination unit 105 generates cooperative operation information for the in-vehicle device 300 to start or stop the cooperative operation with the infrastructure sensor 200, and transmits it to the in-vehicle device 300. When the host vehicle reaches the infrastructure cooperation section, the in-vehicle device 300 controls the host vehicle using information from the infrastructure sensor 200, and performs an infrastructure cooperative operation for performing avoidance of collision with an obstacle or the like. Note that the infrastructure cooperation section setting method by the infrastructure cooperation section determination unit 105 and the contents of the infrastructure cooperative operation performed in the infrastructure cooperation section will be described in detail later.

The vehicle management unit 106 manages each vehicle on which the in-vehicle device 300 is mounted. The vehicle management unit 106 holds, for example, a unique vehicle ID set in advance for each vehicle, stores information such as the position and control state of each vehicle, and the route generated by the vehicle route generator 101 for each vehicle in combination with this vehicle ID, and thereby manages each vehicle.

The vehicle cooperation unit 107 has a communication function with the in-vehicle device 300, receives the position information and route information of the host vehicle transmitted from the in-vehicle device 300, and transmits the cooperative operation information generated by the infrastructure cooperation section determination unit 105 to the in-vehicle device 300. The vehicle cooperation unit 107 can communicate with the in-vehicle device 300 using, for example, a mobile communication network (4G, 5G).

The notification information generator 108 generates notification information for notifying the occupant of the host vehicle that the in-vehicle device 300 has started or stopped the cooperative operation with the infrastructure sensor 200 based on the infrastructure cooperation section determined by the infrastructure cooperation section determination unit 105. The notification information generated by the notification information generator 108 is transmitted to the in-vehicle device 300 together with the cooperative operation information corresponding to the infrastructure cooperation section, and used for notification to the occupant of the host vehicle, a management screen displayed on a display device (not shown), and the like. The management screen is a screen provided to a system operator or the like who uses the vehicle control system 1 in order to confirm the operation state of the vehicle control system 1. Specific contents of this management screen will be described later.

In the infrastructure sensor 200, the sensor unit 201 is configured using various sensors such as a camera, a radar, and Light Detection and Ranging (LiDAR). The sensor unit 201 generates sensing information within a predetermined sensing range corresponding to these sensors based on the position where the infrastructure sensor 200 is installed. This sensing information includes information on obstacles existing within the sensing range.

The infrastructure-side vehicle cooperation unit 202 has a communication function with the in-vehicle device 300, and transmits the sensing information generated by the sensor unit 201 and the information transmitted from the server 100 to the infrastructure sensor 200 to the in-vehicle device 300. The infrastructure-side vehicle cooperation unit 202 can communicate with the in-vehicle device 300 using, for example, road-to-vehicle communication called V2I. For road-to-vehicle communication, a communication standard such as DSRC (Dedicated Short Range Communications) can be employed.

The infrastructure position acquisition unit 203 acquires the position where the infrastructure sensor 200 is installed. For example, position information set in advance at the time of shipment or installation of the infrastructure sensor 200 may be acquired, or position information may be acquired from a position detector such as a GPS sensor (not shown) assuming a case where the infrastructure sensor 200 is movable.

The infrastructure-side server cooperation unit 204 has a communication function with the server 100, and transmits information indicating the position of the infrastructure sensor 200 acquired by the infrastructure position acquisition unit 203, the sensing range of the sensor unit 201, and the like to the server 100. In addition, it is also possible to perform communication via the infrastructure sensor 200 between the server 100 and the in-vehicle device 300 by receiving the information transmitted from the server 100 at the infrastructure-side server cooperation unit 204 and transmitting it to the in-vehicle device 300 by the infrastructure-side vehicle cooperation unit 202, or conversely, by receiving the information transmitted from the in-vehicle device 300 at the infrastructure-side vehicle cooperation unit 202 and transmitting it to the server 100 by the infrastructure-side server cooperation unit 204. The infrastructure-side server cooperation unit 204 can communicate with the infrastructure cooperation unit 104 of the server 100 using, for example, a mobile communication network (4G, 5G) or a fixed line.

In the in-vehicle device 300, the vehicle-side server cooperation unit 301 has a communication function with the server 100, and transmits the position information and route information of the host vehicle to the server 100 and also receives the cooperative operation information and notification information transmitted from the server 100. The vehicle-side server cooperation unit 301 can communicate with the vehicle cooperation unit 107 of the server 100 using, for example, a mobile communication network (4G, 5G).

The mode setting unit 302 sets or cancels the cooperative operation mode that is a mode in which the host vehicle performs a cooperative operation with the infrastructure sensor 200 based on the cooperative operation information transmitted from the server 100, the position of the host vehicle determined by the vehicle position determination unit 308, and the map information of the map information 307. When the cooperative operation mode is set by the mode setting unit 302, the in-vehicle device 300 performs a cooperative operation using the sensing information transmitted from the infrastructure sensor 200. On the other hand, when the setting of the cooperative operation mode by the mode setting unit 302 is canceled, the cooperative operation with the infrastructure sensor 200 is not performed in the in-vehicle device 300, and a normal vehicle control using an in-vehicle sensor 31 mounted on the host vehicle is performed.

The vehicle-side infrastructure cooperation unit 303 has a communication function with the infrastructure sensor 200, and receives sensing information transmitted from the infrastructure sensor 200 and information transmitted from the server 100 via the infrastructure sensor 200. The vehicle-side infrastructure cooperation unit 303 can perform communication with the infrastructure-side vehicle cooperation unit 202 of the infrastructure sensor 200 using, for example, road-to-vehicle communication called V2I.

The determination unit 304 determines the operation to be taken by the host vehicle using the sensing information transmitted from the infrastructure sensor 200 or the in-vehicle sensor 31. For example, when sensing information indicating an obstacle existing in front of the host vehicle is obtained from the infrastructure sensor 200 or the in-vehicle sensor 31, the determination unit 304 determines to stop the host vehicle or change the traveling direction of the host vehicle as an operation for avoiding the obstacle. When the cooperative operation mode is set by the mode setting unit 302, the determination unit 304 determines the operation to be taken by the host vehicle using the sensing information of the infrastructure sensor 200 and the sensing information of the in-vehicle sensor 31. When the cooperative operation mode is not set by the mode setting unit 302, the determination unit 304 determines the operation to be taken by the host vehicle using the sensing information of the in-vehicle sensor 31.

The vehicle-side display controller 305 generates a screen to be displayed on the vehicle-side display unit 306 based on the notification information received from the server 100 by the vehicle-side server cooperation unit 301, the setting state of the cooperative operation mode by the mode setting unit 302, and the determination result of the determination unit 304. The vehicle-side display unit 306 is configured by, for example, a liquid crystal display, and displays the screen generated by the vehicle-side display controller 305 to give a notification to an occupant of the host vehicle. Thereby, for example, a screen for notifying an occupant of the host vehicle that the setting of the cooperative operation mode has been started or canceled, or a screen for notifying an occupant of the host vehicle that the host vehicle is stopped or the traveling direction of the host vehicle is changed as an obstacle avoidance action is displayed on the vehicle-side display unit 306. Note that the sound output from a speaker (not shown) may be used together with the screen of the vehicle-side display unit 306 or instead of the screen of the vehicle-side display unit 306 to notify the occupant.

Similar to the map information 102 of the server 100, the map information 307 is information representing road maps in various places of the country, and is stored in a storage (HDD, SSD, etc.) (not shown) in the in-vehicle device 300. The map information 307 is used, for example, for setting the cooperative operation mode by the mode setting unit 302 and for determining the operation of the host vehicle by the determination unit 304. Further, the map information 307 may be used to display a map screen around the host vehicle on the vehicle-side display unit 306.

The vehicle position determination unit 308 determines the position of the host vehicle based on a GPS signal received by a GPS sensor (not shown) and information (speed, acceleration, steering amount, etc.) on the motion state of the host vehicle detected by the in-vehicle sensor 31. Note that the position of the host vehicle may be determined to be on the road by performing a well-known map matching process using the map information 307. The position information of the host vehicle determined by the vehicle position determination unit 308 is transmitted to the server 100 by the vehicle-side server cooperation unit 301, and is used for the generation of the route of the host vehicle performed by the vehicle route generator 101, the determination of the infrastructure cooperation section performed by the infrastructure cooperation section determination unit 105, and the like.

The vehicle controller 309 controls the host vehicle based on the determination result of the operation of the host vehicle by the determination unit 304. The vehicle controller 309 is connected to a drive unit 32 of the host vehicle and controls the drive unit 32 to perform a brake operation and a steering wheel operation of the host vehicle, thereby controlling the motion state of the host vehicle according to the determination result of the determination unit 304.

Next, a specific example of traveling support performed by the vehicle control system 1 according to the present embodiment will be described with reference to FIGS. 2 to 4.

Figure 2:
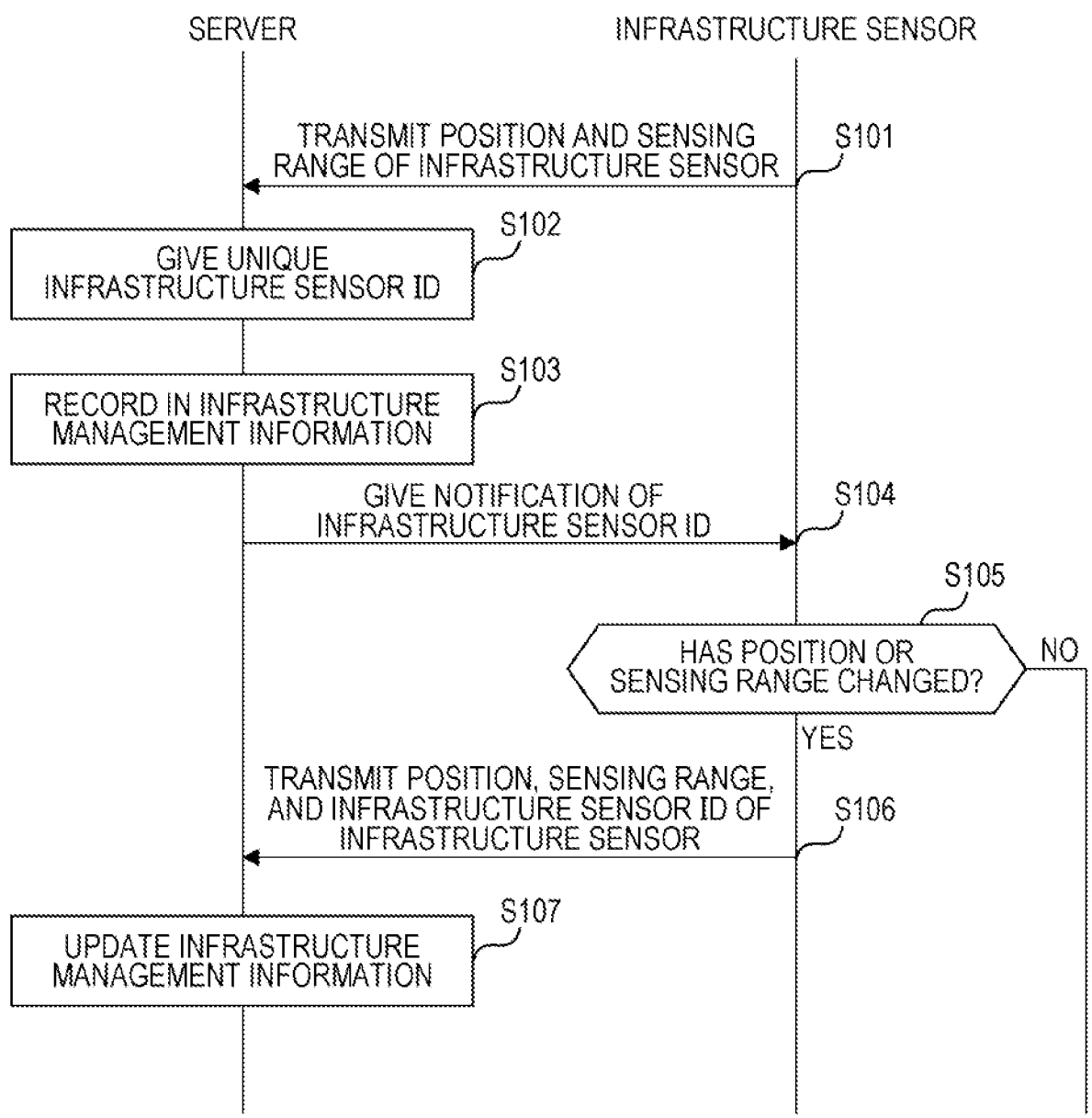
FIG. 2 is a sequence diagram of an infrastructure sensor registration process.

FIG. 2 is a sequence diagram of an infrastructure sensor registration process performed by the vehicle control system 1 to update the infrastructure management information when the infrastructure sensor 200 is newly installed or when the position or sensing range of the infrastructure sensor 200 changes.

In step S101, the infrastructure sensor 200 transmits the position information of the infrastructure sensor 200 acquired by the infrastructure position acquisition unit 203 and the information of the sensing range by the sensor unit 201 to the server 100 by the infrastructure-side server cooperation unit 204. The server 100 receives the information transmitted from the infrastructure sensor 200 by the infrastructure cooperation unit 104.

In step S102, the server 100 gives a unique infrastructure sensor ID different from that of the other infrastructure sensors 200 to the infrastructure sensor 200 that has received the position information and the sensing range information in step S101.

In step S103, the server 100 records the position information and the sensing range information received in step S101 in the infrastructure management information in combination with the infrastructure sensor ID given in step S102 by the infrastructure management unit 103. Accordingly, the infrastructure sensor 200 is newly registered in the infrastructure management information and added to the management target by the infrastructure management unit 103.

In step S104, the server 100 notifies the infrastructure sensor 200 of the infrastructure sensor ID given in step S102 as a response to the position information and the sensing range information received in step S101 by the infrastructure cooperation unit 104. The infrastructure sensor ID notified in step S104 is stored and held in the infrastructure sensor 200, and is used as identification information of the infrastructure sensor 200 in subsequent communications with the server 100.

In step S105, the infrastructure sensor 200 determines whether or not the position or sensing range of the infrastructure sensor 200 has changed with respect to the position information and sensing range information transmitted in step S101. If at least one of the position and the sensing range has changed, the process proceeds to step S106, and if not changed, the sequence in FIG. 2 is terminated.

In step S106, the infrastructure sensor 200 transmits the current position information and sensing range information of the infrastructure sensor 200 together with the infrastructure sensor ID notified in step S104 to the server 100 by the infrastructure-side server cooperation unit 204. The server 100 receives the information transmitted from the infrastructure sensor 200 by the infrastructure cooperation unit 104.

In step S107, the server 100 identifies the infrastructure sensor 200 that is the update target of the infrastructure management information, based on the infrastructure sensor ID received in step S106. Then, the infrastructure management unit 103 rewrites the contents of the infrastructure management information of the infrastructure sensor 200 to update the infrastructure management information, based on the position information and sensing range information received in step S106. When the infrastructure management information is updated, the sequence in FIG. 2 is terminated and waits for the next processing cycle.

In the next and subsequent processing cycles, the infrastructure sensor 200 performs the determination in step S105, and if at least one of the position and the sensing range has changed, transmits the current position information and sensing range information together with the infrastructure sensor ID to the server 100 in step S106. The server 100 that has received the information updates the infrastructure management information in step S107.

Figure 3:
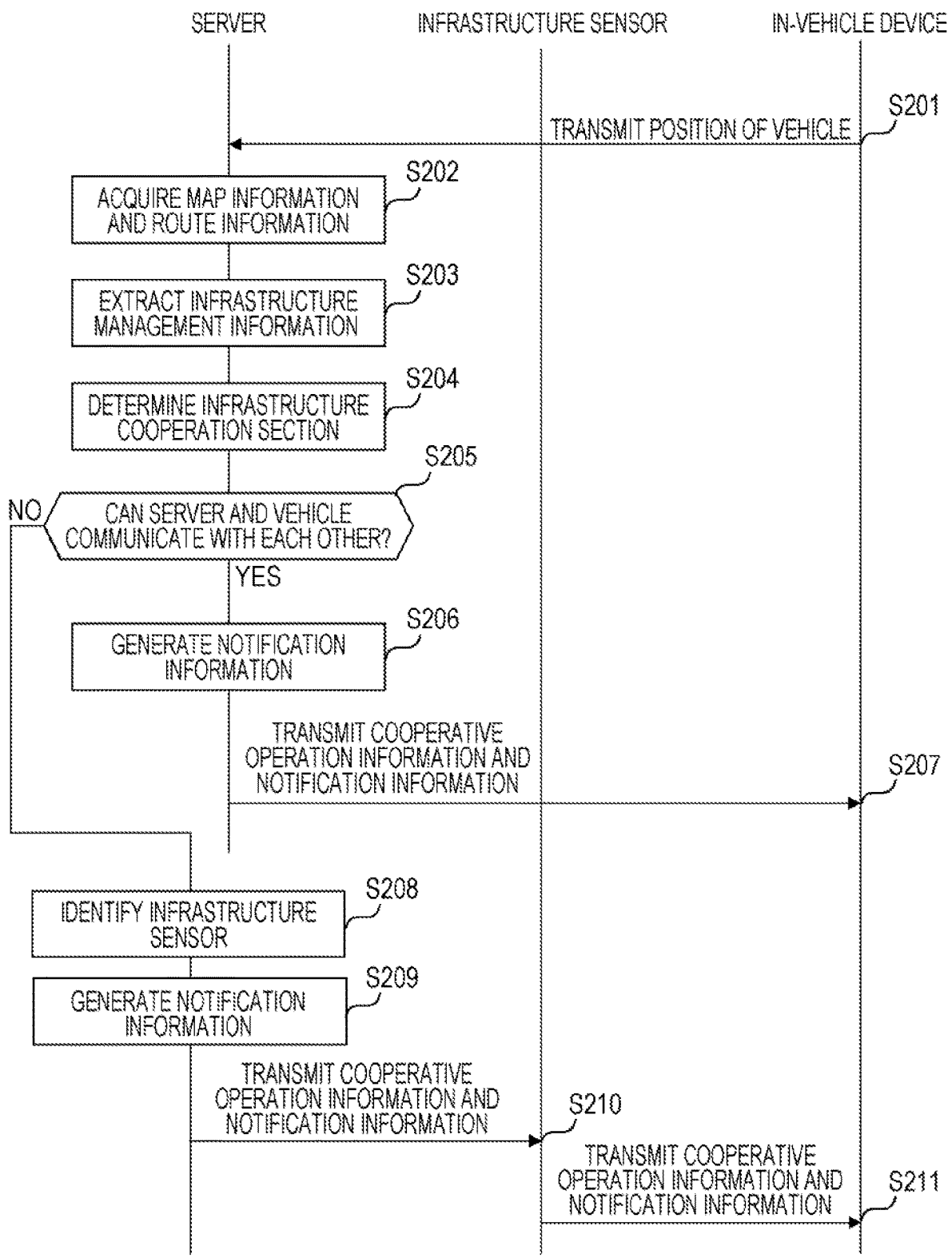
FIG. 3 is a sequence diagram of an infrastructure cooperation section setting process according to the first embodiment of the present invention.

FIG. 3 is a sequence diagram of the infrastructure cooperation section setting process according to the first embodiment of the present invention, which is performed by the vehicle control system 1 to set the infrastructure cooperation section.

In step S201, the in-vehicle device 300 transmits the position information of the host vehicle determined by the vehicle position determination unit 308 to the server 100 by the vehicle-side server cooperation unit 301. The server 100 receives the position information of the host vehicle transmitted from the in-vehicle device 300 by the vehicle cooperation unit 107.

In step S202, the server 100 respectively acquires the map information and the route information in the vicinity of the host vehicle from the map information 102 and the vehicle route generator 101, based on the position information of the host vehicle received from the in-vehicle device 300 in step S201 by the infrastructure cooperation section determination unit 105. When the route of the host vehicle is set in the in-vehicle device 300, the route information of the host vehicle, instead of being acquired from the vehicle route generator 101, may be acquired by transmitting the route information in addition to the position information of the host vehicle from the in-vehicle device 300 to the server 100 in step S201.

In step S203, the server 100 extracts information on the infrastructure sensor 200 related to the host vehicle from the infrastructure management information held by the infrastructure management unit 103 by the infrastructure cooperation section determination unit 105. Here, for example, based on the position information of the host vehicle received in step S201, the server 100 extracts the infrastructure management information about the infrastructure sensor 200 existing within a predetermined range from the host vehicle.

In step S204, the server 100 determines the infrastructure cooperation section of the host vehicle based on the map information and route information in the vicinity of the host vehicle acquired in step S202 and the infrastructure management information extracted in step S203 by the infrastructure cooperation section determination unit 105. Here, for example, a road section that is within a predetermined range along a traveling route from the position of the host vehicle and is covered by the sensing range of any of the infrastructure sensors 200 is determined as the infrastructure cooperation section of the host vehicle. In addition, when the road section covered by the sensing range of the infrastructure sensor 200 is divided into a plurality of road sections on the way, it is preferable to determine a plurality of infrastructure cooperation sections in accordance with the plurality of road sections. If the traveling route of the host vehicle is not set or unknown, the road section covered by the sensing range of one of the infrastructure sensors 200 in the predetermined range centered on the position of the host vehicle may be determined as the infrastructure cooperation section of the host vehicle.

In step S205, the server 100 determines whether or not the server 100 and the host vehicle can communicate with each other by the vehicle cooperation unit 107. If communication is normally established between the vehicle cooperation unit 107 and the vehicle-side server cooperation unit 301 of the in-vehicle device 300, the server 100 determines that the server 100 and the host vehicle can communicate with each other, and proceeds to step S206. On the other hand, when the host vehicle is traveling outside the mobile communication area such as an underground or a mountainous area and the communication between the vehicle cooperation unit 107 and the vehicle-side server cooperation unit 301 is interrupted, or when the communication speed is extremely slow due to congestion or the like, the server 100 determines that communication between the server 100 and the host vehicle is impossible, and proceeds to step S208.

When the process proceeds to step S206, in step S206, the server 100 generates notification information based on the infrastructure cooperation section determined in step S204 by the notification information generator 108. For example, screen information when the in-vehicle device 300 starts the cooperative operation with the infrastructure sensor 200 and screen information when the in-vehicle device 300 stops the cooperative operation with the infrastructure sensor 200 are generated as notification information, respectively. Furthermore, screen information when an obstacle is detected by the infrastructure sensor 200 during the infrastructure cooperative operation may be generated. In addition to this, it is possible to generate arbitrary notification information in accordance with the content of notification to an occupant of the host vehicle performed in the in-vehicle device 300.

In step S207, the server 100 transmits the cooperative operation information corresponding to the infrastructure cooperation section determined in step S204 and the notification information generated in step S206 to the in-vehicle device 300 by the vehicle cooperation unit 107. The in-vehicle device 300 receives the cooperative operation information and the notification information transmitted from the server 100 by the vehicle-side server cooperation unit 301.

When the process proceeds to step S208, in step S208, the server 100 identifies the infrastructure sensor 200 corresponding to the host vehicle by the infrastructure management unit 103. For example, the server 100 identifies the infrastructure sensor 200 closest to the current position of the host vehicle or the infrastructure sensor 200 existing at the start point of the infrastructure cooperation section determined in step S204 as the infrastructure sensor 200 corresponding to the host vehicle.

In step S209, the server 100 generates, as in step S206, notification information based on the infrastructure cooperation section determined in step S204 by the notification information generator 108.

In step S210, the server 100 transmits the cooperative operation information corresponding to the infrastructure cooperation section determined in step S204 and the notification information generated in step S209 to the infrastructure sensor 200 identified in step S208 by the infrastructure cooperation unit 104. The infrastructure sensor 200 receives the cooperative operation information and the notification information transmitted from the server 100 by the infrastructure-side server cooperation unit 204.

In step S211, the infrastructure sensor 200 transmits the cooperative operation information and the notification information received in step S210 to the in-vehicle device 300 by the infrastructure-side vehicle cooperation unit 202. Thereby, the cooperative operation information and the notification information transmitted from the server 100 in step S210 are transmitted to the in-vehicle device 300 via the infrastructure sensor 200. The in-vehicle device 300 receives the cooperative operation information and the notification information transmitted from the server 100 via the infrastructure sensor 200 by the vehicle-side infrastructure cooperation unit 303.

When the cooperative operation information and the notification information are received in step S207 or S211, the in-vehicle device 300 shifts to the infrastructure cooperative operation using these pieces of information.

In the cooperative operation information transmitted from the server 100 to the in-vehicle device 300 in step S207 or steps S210 and S211, various expression formats can be used so that the in-vehicle device 300 can start or stop the cooperative operation with the infrastructure sensor 200 according to the infrastructure cooperation section. For example, the position information and the sensing range information of all the infrastructure sensors 200 existing in the infrastructure cooperation section may be transmitted as cooperative operation information. Alternatively, position information and sensing range information of the infrastructure sensor 200 existing within a predetermined range in the vicinity of the host vehicle among the infrastructure sensors 200 existing in the infrastructure cooperation section may be extracted and transmitted as cooperative operation information. At this time, the range of the infrastructure sensor 200 included in the cooperative operation information may be changed according to the traveling speed of the host vehicle. For example, the range of the infrastructure sensor 200 included in the cooperative operation information is increased as the traveling speed of the host vehicle is higher. In this way, since the information amount of the cooperative operation information transmitted from the server 100 to the in-vehicle device 300 can be appropriately adjusted according to the situation, the communication load can be reduced.

Alternatively, instead of the position and sensing range of each infrastructure sensor 200 in the infrastructure cooperation section, information on the start point and end point of the infrastructure cooperation section may be transmitted as cooperative operation information. In this case, information on the position and sensing range of the infrastructure sensors 200 respectively existing at the start point and the end point may be transmitted, or the coordinate value of the start point and the end point or the distance from the current position of the host vehicle may be transmitted. Furthermore, based on the position and traveling speed of the host vehicle, timings at which the host vehicle respectively passes through the start point and the end point of the infrastructure cooperation section may be calculated, and information indicating the timings may be transmitted as the cooperative operation information. Note that, the in-vehicle device 300 can determine that the host vehicle has left the infrastructure cooperation section when sensing information cannot be received from the infrastructure sensor 200, and can terminate the infrastructure cooperative operation. In this case, the information on the end point of the infrastructure cooperation section may not be included in the cooperative operation information.

Figure 4:
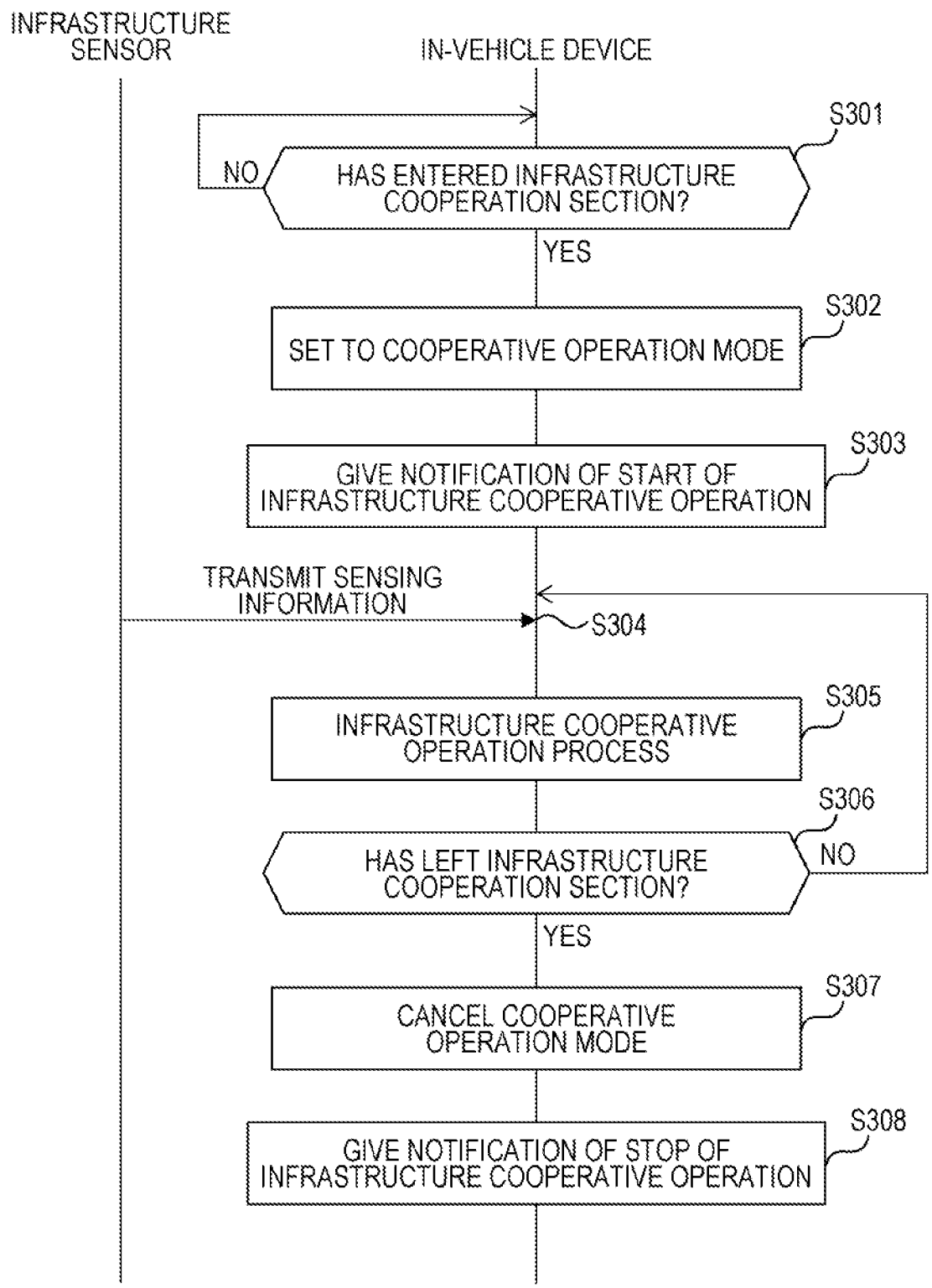
FIG. 4 is a sequence diagram of an infrastructure cooperative operation process according to the first embodiment of the present invention.

FIG. 4 is a sequence diagram of the infrastructure cooperative operation process according to the first embodiment of the present invention, which is performed by the vehicle control system 1 to perform the infrastructure cooperative operation.

In step S301, the in-vehicle device 300 determines whether or not the host vehicle has entered the infrastructure cooperation section based on the cooperative operation information received in step S207 or S211 of FIG. 3, the position of the host vehicle determined by the vehicle position determination unit 308, and the map information of the map information 307 by the mode setting unit 302. If the host vehicle has not yet entered the infrastructure cooperation section, the process stays at step S301, and if the vehicle has entered the infrastructure cooperation section, the process proceeds to step S302.

In step S302, the in-vehicle device 300 sets the operation mode of the host vehicle to the cooperative operation mode by the mode setting unit 302, receives the sensing information transmitted from the infrastructure sensor 200, and starts the infrastructure cooperative operation.

In step S303, the in-vehicle device 300 notifies an occupant of the host vehicle that the in-vehicle device 300 has started the infrastructure cooperative operation, based on the notification information received in step S207 or S211 of FIG. 3 by the vehicle-side display controller 305 and the vehicle-side display unit 306. Here, for example, the in-vehicle device 300 notifies an occupant of the host vehicle of the start of the infrastructure cooperative operation by displaying a predetermined screen on the vehicle-side display unit 306.

In step S304, the infrastructure sensor 200 transmits the sensing information generated by the sensor unit 201 to the in-vehicle device 300 mounted on the host vehicle traveling in the infrastructure cooperation section by the infrastructure-side vehicle cooperation unit 202. The in-vehicle device 300 receives the sensing information transmitted from the infrastructure sensor 200 by the vehicle-side infrastructure cooperation unit 303.

In step S305, the in-vehicle device 300 performs a predetermined infrastructure cooperative operation process using the sensing information received from the infrastructure sensor 200 in step S304. Here, for example, the determination unit 304 determines the presence or absence of an obstacle based on the sensing information, and if it is determined that there is an obstacle, determines the operation of the host vehicle for avoiding a collision with the obstacle. Then, the vehicle controller 309 controls the drive unit 32 according to the operation of the host vehicle determined by the determination unit 304, thereby adjusting the brake amount and the steering amount of the host vehicle and performing a control so that the host vehicle does not collide with an obstacle. Alternatively, by only notifying an occupant of the vehicle of the presence of an obstacle, attention to the obstacle may be called, or these may be combined.

In step S306, the in-vehicle device 300 determines whether or not the host vehicle has left the infrastructure cooperation section based on the cooperative operation information received in step S207 or S211 of FIG. 3 by the mode setting unit 302. Here, as described above, the in-vehicle device 300 may determine whether or not the host vehicle has left the infrastructure cooperation section based on the reception status of sensing information from the infrastructure sensor 200. If the host vehicle is still traveling in the infrastructure cooperation section, the process returns to step S304 to continue reception of the sensing information and the infrastructure cooperative operation process. If the host vehicle has left the infrastructure cooperation section, the process proceeds to step S307.

In step S307, the in-vehicle device 300 cancels the cooperative operation mode set in step S302 by the mode setting unit 302, and stops the infrastructure cooperative operation.

In step S308, the in-vehicle device 300 notifies an occupant of the host vehicle that the in-vehicle device 300 has stopped the infrastructure cooperative operation, based on the notification information received in step S207 or S211 of FIG. 3 by the vehicle-side display controller 305 and the vehicle-side display unit 306. Here, for example, the in-vehicle device 300 notifies an occupant of the host vehicle of the stop of the infrastructure cooperative operation by displaying a predetermined screen on the vehicle-side display unit 306. When the stop of the infrastructure cooperative operation is notified, the sequence of FIG. 4 is terminated.

Figure 5A:
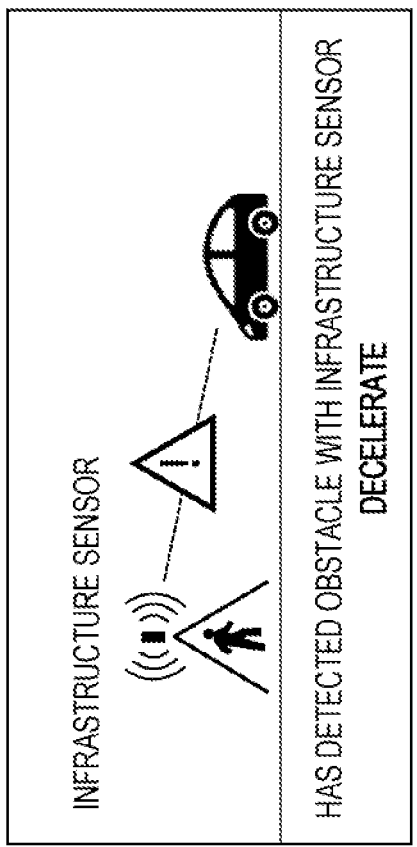
FIGS. 5A to 5D are diagrams showing an example of a notification screen during infrastructure cooperative operation.

FIGS. 5A to 5D are diagrams showing a notification screen example at the time of the infrastructure cooperative operation displayed on the vehicle-side display unit 306 of the in-vehicle device 300. FIG. 5A is a screen example displayed in step S303 of FIG. 4. This screen indicates that when the host vehicle enters the infrastructure cooperation section, the operation mode of the host vehicle is switched to the cooperative operation mode, and the in-vehicle device 300 starts the infrastructure cooperative operation.

Figure 5B:
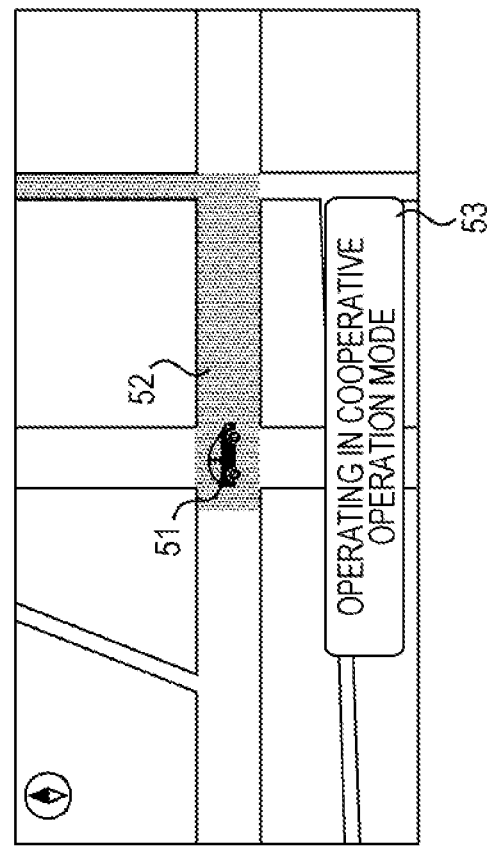

FIG. 5B is a screen example displayed when an obstacle is detected in the infrastructure cooperative operation process performed in step S305 of FIG. 4. This screen indicates that an obstacle is detected by the infrastructure sensor 200 and the host vehicle is decelerated in order to avoid a collision with the obstacle.

Figure 5C:
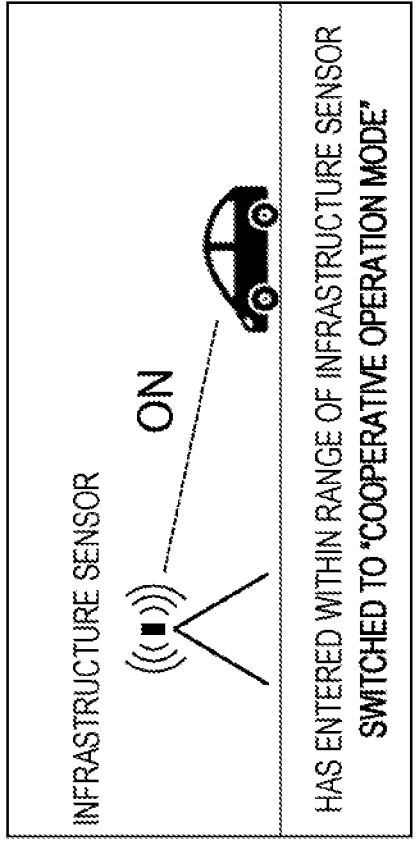

FIG. 5C is a screen example displayed in step S308 of FIG. 4. This screen indicates that when the host vehicle leaves the infrastructure cooperation section, the cooperative operation mode is canceled, and the in-vehicle device 300 stops the infrastructure cooperative operation.

Figure 5D:
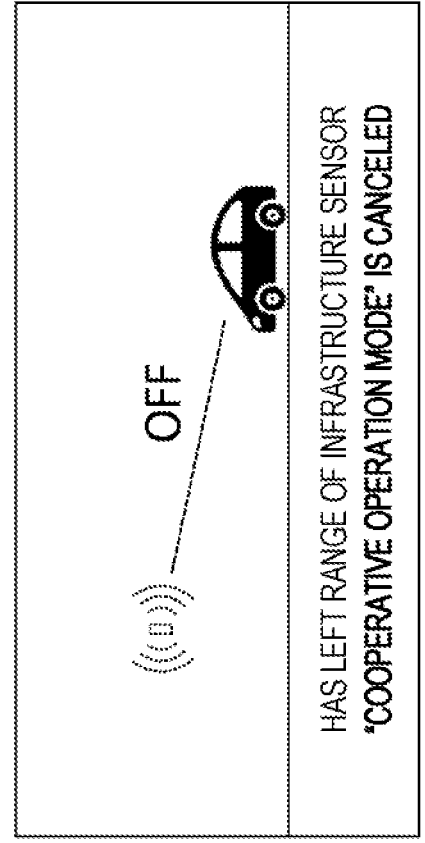

FIG. 5D is another screen example displayed in step S303 of FIG. 4. On this screen, a map of the vicinity of the host vehicle is displayed, an icon 51 indicating the position of the host vehicle is displayed on the map, and a range 52 of the infrastructure cooperation section is displayed in a color-coded manner with other road sections. Further, a text box 53 indicating that the operation mode of the host vehicle is switched to the cooperative operation mode and the in-vehicle device 300 starts the infrastructure cooperative operation is displayed.

Figure 9B:
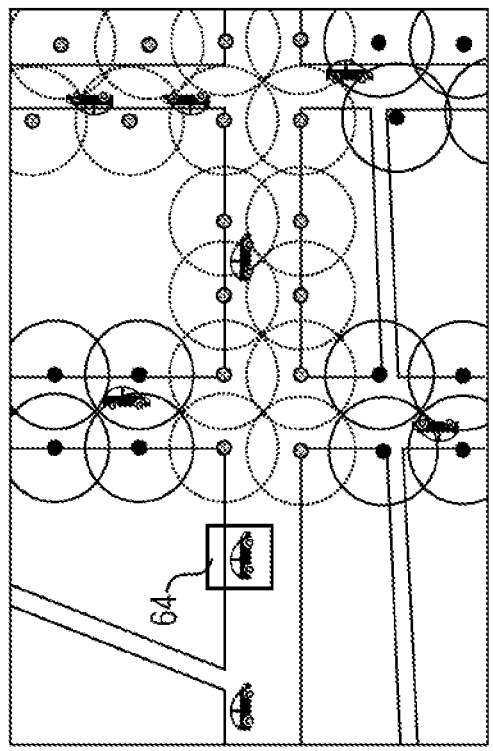
FIGS. 9A to 9C are diagrams showing an example of a management screen.
Figure 9A:
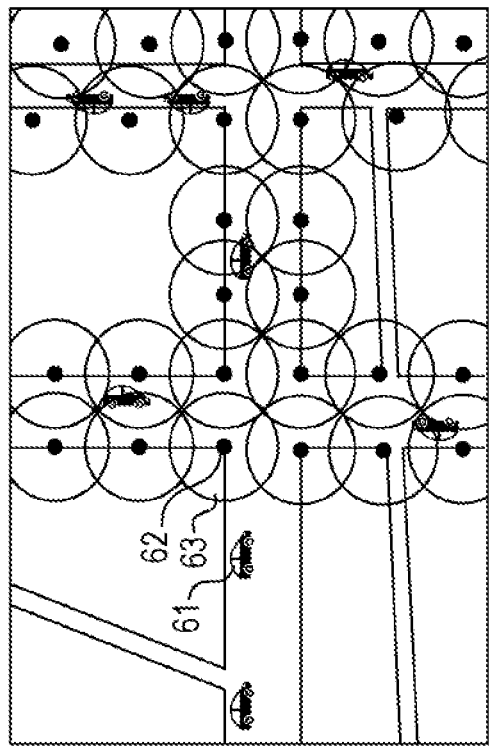
Figure 9C:
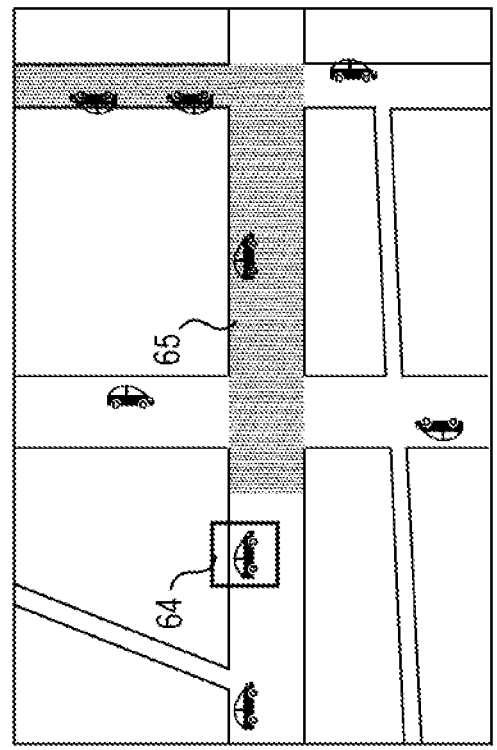

FIGS. 9A to 9C are diagrams showing an example of a management screen displayed based on notification information transmitted from the notification information generator 108. FIG. 9A shows an example of a basic management screen. In this management screen, a map of an arbitrary region is displayed, and an icon 61 indicating the position of each vehicle that is traveling in the region and is mounted with the in-vehicle device 300 is displayed on the map, and the position and sensing range of each infrastructure sensor 200 are indicated by icons 62 and 63, respectively.

In the management screen of FIG. 9A, when the system operator selects an arbitrary vehicle with a cursor 64 as shown in FIG. 9B, the display forms of the icons 62 and 63 indicating the position and sensing range of each infrastructure sensor 200 included in the infrastructure cooperation section determined by the server 100 for that vehicle are changed, respectively. As a result, since each infrastructure sensor 200 corresponding to the infrastructure cooperation section of the vehicle and the other infrastructure sensors 200 are displayed in a mutually identifiable form, the system operator can easily grasp the infrastructure cooperation section of the selected vehicle from the management screen of FIG. 9B.

Alternatively, the management screen of FIG. 9C may be displayed instead of the management screen of FIG. 9B. In the management screen of FIG. 9C, instead of changing the display form of the icons 62 and 63 indicating the position and sensing range of each infrastructure sensor 200 included in the infrastructure cooperation section of the vehicle selected with the cursor 64, a range 65 of the infrastructure cooperation section of the vehicle is displayed in a color-coded manner with other road sections. Even in this case, the system operator can easily grasp the infrastructure cooperation section of the selected vehicle from the management screen of FIG. 9C.

According to the first embodiment of the present invention described above, the following operational effects are obtained.

(1) The vehicle control system 1 includes a server 100 that performs control related to traveling support of the host vehicle, an in-vehicle device 300 mounted on the host vehicle, and an infrastructure sensor 200 capable of generating sensing information outside the host vehicle. The server 100 includes an infrastructure management unit 103 that holds infrastructure management information including the position and sensing range of the infrastructure sensor 200, and an infrastructure cooperation section determination unit 105 that determines an infrastructure cooperation section indicating a range in which the in-vehicle device 300 performs a cooperative operation with the infrastructure sensor 200 and performs traveling support of the host vehicle, based on the infrastructure management information held by the infrastructure management unit 103. The infrastructure sensor 200 includes an infrastructure position acquisition unit 203 that acquires the position of the infrastructure sensor 200, a sensor unit 201 that generates sensing information within the sensing range based on the position of the infrastructure sensor 200, an infrastructure-side server cooperation unit 204 that transmits information indicating the position and sensing range of the infrastructure sensor 200 to the server 100, and an infrastructure-side vehicle cooperation unit 202 that transmits the sensing information generated by the sensor unit 201 to the in-vehicle device 300. The in-vehicle device 300 includes a mode setting unit 302 that sets or cancels the cooperative operation mode for performing the cooperative operation with the infrastructure sensor 200, a vehicle-side infrastructure cooperation unit 303 that acquires the sensing information transmitted from the infrastructure sensor 200 when the cooperative operation mode is set, a determination unit 304 that determines the operation of the host vehicle using the sensing information acquired by the vehicle-side infrastructure cooperation unit 303, and a vehicle controller 309 that controls the host vehicle based on the determination result of the operation of the host vehicle by the determination unit 304. The server 100, based on the infrastructure cooperation section determined by the infrastructure cooperation section determination unit 105, transmits cooperative operation information for the in-vehicle device 300 to start or stop the cooperative operation with the infrastructure sensor 200 to the in-vehicle device 300 (steps S207 and S210 to S211). The in-vehicle device 300 sets or cancels the cooperative operation mode by the mode setting unit 302 based on the cooperative operation information transmitted from the server 100 (steps S302 and S307). Thus, the traveling support of the host vehicle can be performed appropriately according to the installation state of the infrastructure sensor 200.

(2) The server 100 includes a vehicle cooperation unit 107 having a communication function with the in-vehicle device 300, and the cooperative operation information is transmitted from the server 100 to the in-vehicle device 300 by the vehicle cooperation unit 107 (step S207). Thus, the cooperative operation information can be directly transmitted from the server 100 to the in-vehicle device 300.

(3) The server 100 includes an infrastructure cooperation unit 104 having a communication function with the infrastructure sensor 200, and the cooperative operation information is transmitted from the server 100 to the in-vehicle device 300 via the infrastructure sensor 200 by the infrastructure cooperation unit 104 (steps S210 to S211). Thus, even when the cooperative operation information cannot be directly transmitted from the server 100 to the in-vehicle device 300, it can be transmitted via the infrastructure sensor 200.

(4) The server 100 determines which of the vehicle cooperation unit 107 or the infrastructure cooperation unit 104 is used for transmission of the cooperative operation information based on the communication state with the in-vehicle device 300 in the vehicle cooperation unit 107 (step S205). Thus, according to the communication state between the server 100 and the in-vehicle device 300, the cooperative operation information can be transmitted by an appropriate method.

(5) The cooperative operation information can include information on the position and sensing range of each infrastructure sensor 200 included in the infrastructure cooperation section. Alternatively, the information on the position and sensing range of the infrastructure sensor existing in at least one of the start point and end point of the infrastructure cooperation section can also be included. Alternatively, the information on at least one of the start point and end point of the infrastructure cooperation section can also be included. Thus, the cooperative operation information can express the infrastructure cooperation section by arbitrary methods.

(6) The server 100 includes a vehicle route generator 101 that generates a route on which the host vehicle should travel. The infrastructure cooperation section determination unit 105 determines an infrastructure cooperation section based on the infrastructure management information and the route generated by the vehicle route generator 101 (step S204). Thus, an infrastructure cooperation section can be determined reliably with respect to the road on which the host vehicle will pass from now on.

(7) The server 100 includes a notification information generator 108 that generates notification information for notifying an occupant of the host vehicle that the in-vehicle device 300 has started or stopped the cooperative operation with the infrastructure sensor 200. The notification information is transmitted from the server 100 to the in-vehicle device 300 (steps S207 and S210 to S211), and the in-vehicle device 300 gives a notification to the occupant based on the notification information transmitted from the server 100 and the setting state of the cooperative operation mode by the mode setting unit 302 (steps S303 and S308). Thus, it is possible to reliably notify an occupant of the host vehicle that the in-vehicle device 300 has started or stopped the infrastructure cooperative operation.

(8) As described with reference to FIGS. 9A to 9C, the server 100 includes a notification information generator 108 that generates notification information for providing a management screen capable of displaying the infrastructure cooperation section determined for each vehicle on which the in-vehicle device 300 is mounted for any vehicle. Thus, it is possible to provide a management screen by which a system operator can easily grasp the infrastructure cooperation section of the vehicle which the system operator wants to know.

Second Embodiment

Figure 6:
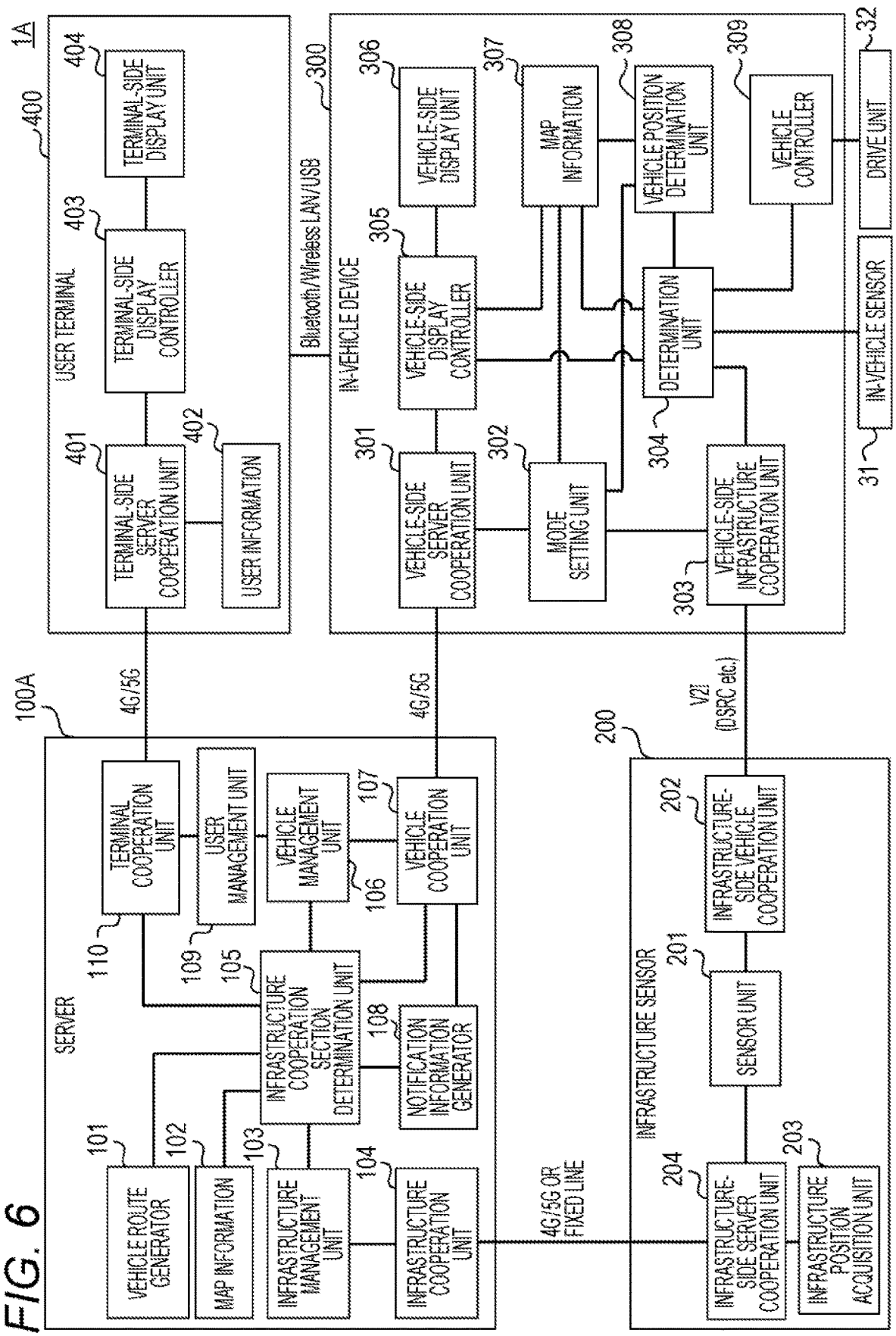
FIG. 6 is a diagram showing a configuration of a vehicle control system according to a second embodiment of the present invention.

FIG. 6 is a diagram showing a configuration of a vehicle control system according to the second embodiment of the present invention. A vehicle control system 1A shown in FIG. 6 includes a server 100A, an infrastructure sensor 200, an in-vehicle device 300, and a user terminal 400, and performs traveling support such as avoidance of collision with an obstacle for a host vehicle in which the in-vehicle device 300 is mounted, as in the vehicle control system 1 described in the first embodiment. The vehicle control system 1A of the present embodiment is different from the vehicle control system 1 of the first embodiment in a point that it further includes a user terminal 400 and the server 100A further includes respective function blocks of a user management unit 109 and a terminal cooperation unit 110. Hereinafter, the vehicle control system 1A of the present embodiment will be described focusing on this difference.

The user terminal 400 is a portable terminal that a user who is an occupant of the host vehicle has, and is configured by, for example, a smartphone. The user terminal 400 includes respective function blocks of a terminal-side server cooperation unit 401, user information 402, a terminal-side display controller 403, and a terminal-side display unit 404. Although only one user terminal 400 is illustrated in FIG. 6, actually, it is preferable that one or a plurality of user terminals 400 are combined with each vehicle mounted with the in-vehicle device 300 to constitute a vehicle control system 1A.

The user management unit 109 manages each user terminal 400 included in the vehicle control system 1A in association with the in-vehicle device 300. For example, the user terminal 400 and the in-vehicle device 300 are associated with each other by storing the vehicle ID held by the vehicle management unit 106 and the user ID uniquely assigned to each user terminal 400 in advance in association with each other. This association is performed, for example, when a user operates the user terminal 400 to access the server 100A, selects a vehicle possessed by the user, and transmits the user information 402 including a user ID to the server 100A. Alternatively, the user terminal 400 and the in-vehicle device 300 may be connected to each other via a predetermined communication interface (for example, Bluetooth (registered trademark), wireless LAN, USB, etc.), and the user information 402 may be transmitted via the in-vehicle device 300.

The terminal cooperation unit 110 has a communication function with the user terminal 400, receives user information 402 transmitted from the user terminal 400, and transmits notification information generated by the notification information generator 108 to the user terminal 400. The terminal cooperation unit 110 can communicate with the user terminal 400 using, for example, a mobile communication network (4G, 5G).

The terminal-side server cooperation unit 401 has a communication function with the server 100A, transmits the user information 402 to the server 100A, and receives notification information transmitted from the server 100A. The user information 402 is information for identifying the user who has the user terminal 400, and includes the above-described user ID and the like. The terminal-side server cooperation unit 401 can communicate with the terminal cooperation unit 110 of the server 100A using, for example, a mobile communication network (4G, 5G).

The terminal-side display controller 403 generates a screen to be displayed on the terminal-side display unit 404 based on the notification information received by the terminal-side server cooperation unit 401. The terminal-side display unit 404 is configured by, for example, a liquid crystal display or the like, displays a screen generated by the terminal-side display controller 403, and gives a notification to a user who has a user terminal 400 and is in the host vehicle. As a result, a screen similar to the vehicle-side display unit 306 of the in-vehicle device 300 is displayed on the terminal-side display unit 404. Note that audio output from a speaker (not shown) may be used together with the screen of the terminal-side display unit 404 or instead of the screen of the terminal-side display unit 404 to give a notification to the user.

Figure 7:
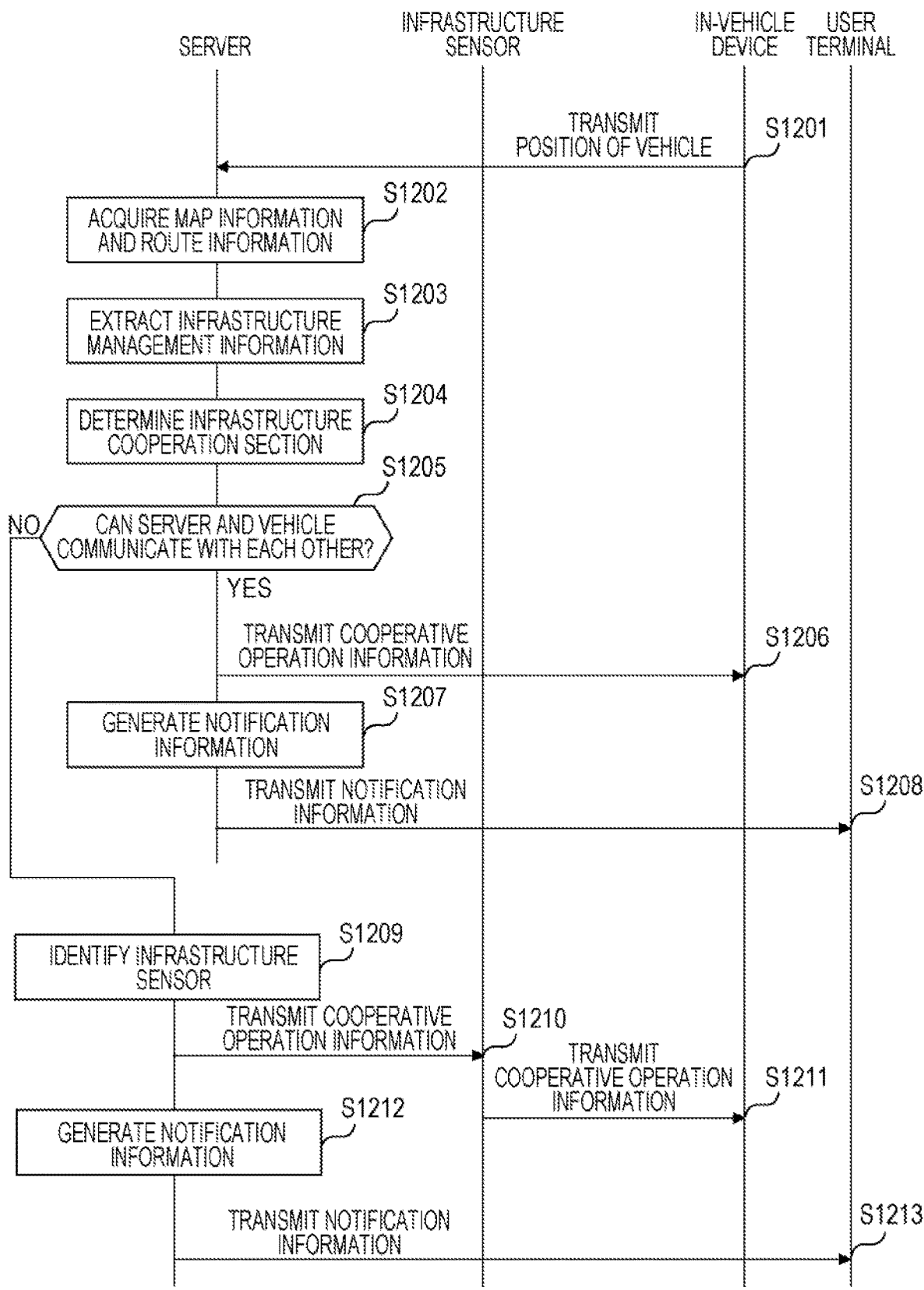
FIG. 7 is a sequence diagram of an infrastructure cooperation section setting process according to the second embodiment of the present invention.

FIG. 7 is a sequence diagram of the infrastructure cooperation section setting process according to the second embodiment of the present invention, which is performed by the vehicle control system 1A to set the infrastructure cooperation section.

In steps S1201 to S1205, processing similar to that in steps S201 to S205 of FIG. 3 described in the first embodiment is performed. If it is determined in step S1205 that the server 100 can communicate with the host vehicle, the process proceeds to step S1206. If it is determined that communication is not possible, the process proceeds to step S1209.

When the process proceeds from step S1205 to S1206, in step S1206, the server 100A transmits the cooperative operation information corresponding to the infrastructure cooperation section determined in step S1204 to the in-vehicle device 300 by the vehicle cooperation unit 107. The in-vehicle device 300 receives the cooperative operation information transmitted from the server 100A by the vehicle-side server cooperation unit 301.

In step S1207, the server 100A generates notification information based on the infrastructure cooperation section determined in step S1204 by the notification information generator 108, as in step S206 of FIG. 3.

In step S1208, the server 100A transmits the notification information generated in step S1207 to the user terminal 400 by the terminal cooperation unit 110. The user terminal 400 receives the notification information transmitted from the server 100A by the terminal-side server cooperation unit 401.

When the process proceeds from step S1205 to S1209, in step S1209, the server 100A identifies the infrastructure sensor 200 corresponding to the host vehicle by the infrastructure management unit 103, as in step S208 of FIG. 3.

In step S1210, the server 100A transmits the cooperative operation information corresponding to the infrastructure cooperation section determined in step S1204 to the infrastructure sensor 200 identified in step S1209 by the infrastructure cooperation unit 104. The infrastructure sensor 200 receives the cooperative operation information transmitted from the server 100A by the infrastructure-side server cooperation unit 204.

In step S1211, the infrastructure sensor 200 transmits the cooperative operation information received in step S1210 to the in-vehicle device 300 by the infrastructure-side vehicle cooperation unit 202. Thereby, the cooperative operation information transmitted from the server 100A in step S1210 is transmitted to the in-vehicle device 300 via the infrastructure sensor 200. The in-vehicle device 300 receives the cooperative operation information transmitted from the server 100A via the infrastructure sensor 200 by the vehicle-side infrastructure cooperation unit 303.

In step S1212, the server 100A generates notification information based on the infrastructure cooperation section determined in step S1204 by the notification information generator 108, as in step S1207.

In step S1213, the server 100A transmits the notification information generated in step S1212 to the user terminal 400 by the terminal cooperation unit 110. The user terminal 400 receives the notification information transmitted from the server 100A by the terminal-side server cooperation unit 401.

When the cooperative operation information is received in step S1206 or S1211, the in-vehicle device 300 shifts to the infrastructure cooperative operation using these pieces of information.

Figure 8:
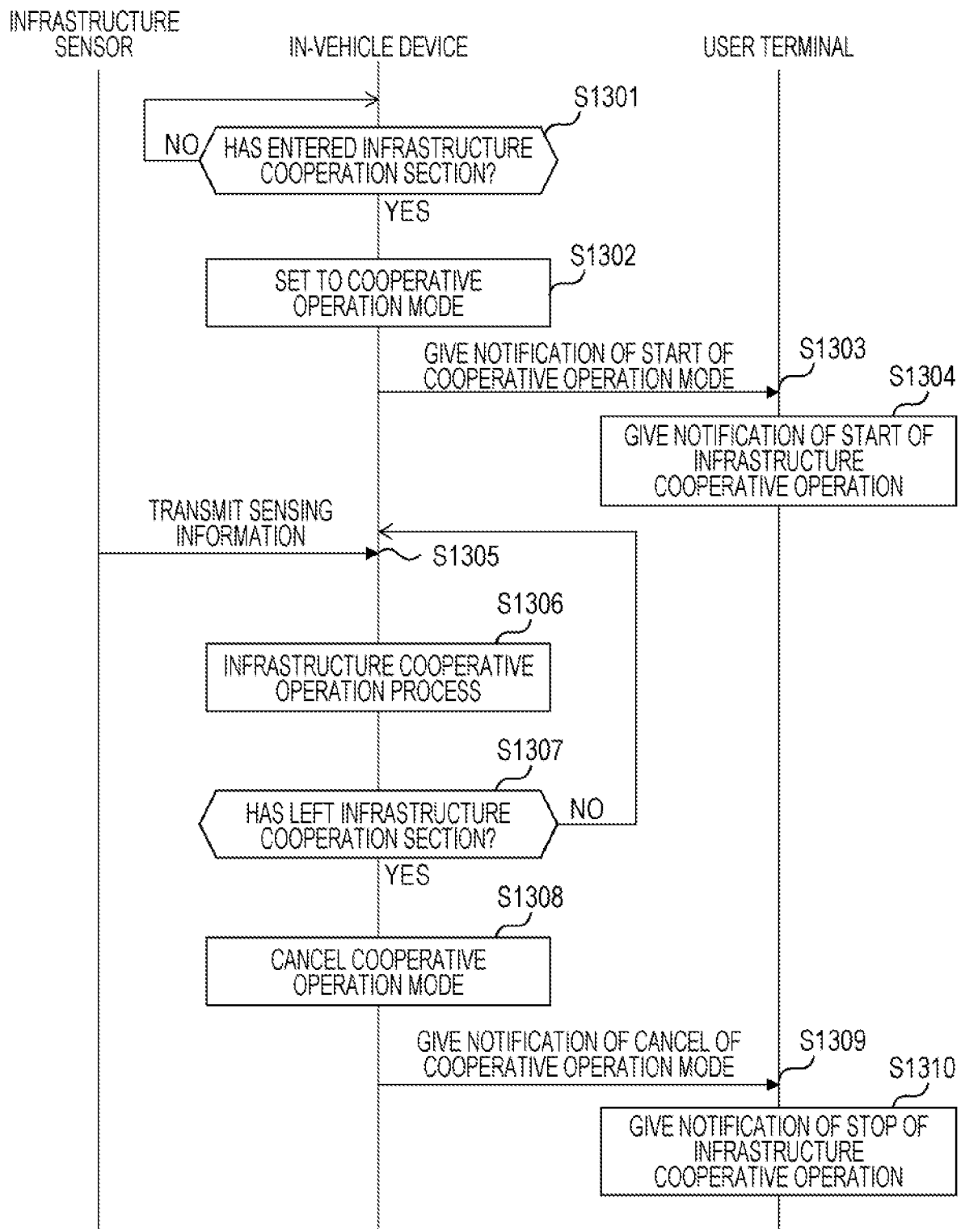
FIG. 8 is a sequence diagram of an infrastructure cooperative operation process according to the second embodiment of the present invention.

FIG. 8 is a sequence diagram of the infrastructure cooperative operation process according to the second embodiment of the present invention, which is performed by the vehicle control system 1A to perform the infrastructure cooperative operation.

In steps S1301 to S1302, the same processing as in steps S301 to S302 of FIG. 4 described in the first embodiment is performed.

In step S1303, the in-vehicle device 300 transmits a notification command for notifying that the operation mode of the host vehicle is set to the cooperative operation mode to the user terminal 400. At this time, for example, the in-vehicle device 300 can transmit a notification command using the communication interface to the user terminal 400 connected in advance using the communication interface described above.

Upon receiving the notification command transmitted from the in-vehicle device 300 in step S1303, in step S1304, the user terminal 400 notifies the occupant of the host vehicle that the in-vehicle device 300 has started the infrastructure cooperative operation based on the notification information received in step S1208 or S1213 of FIG. 7 by the terminal-side display controller 403 and the terminal-side display unit 404. Here, for example, a screen similar to that described in the first embodiment is displayed on the terminal-side display unit 404 to notify the occupant of the host vehicle of the start of the infrastructure cooperative operation.

In steps S1305 to S1308, processing similar to that in steps S304 to S307 of FIG. 4 described in the first embodiment is performed.

In step S1309, the in-vehicle device 300 transmits a notification command for notifying that the setting of the cooperative operation mode has been canceled to the user terminal 400. At this time, the in-vehicle device 300 can transmit the notification command by the same method as in step S1303.

Upon receiving the notification command transmitted from the in-vehicle device 300 in step S1309, in step S1310, the user terminal 400 notifies the occupant of the host vehicle that the in-vehicle device 300 has stopped the infrastructure cooperative operation based on the notification information received in step S1208 or S1213 of FIG. 7 by the terminal-side display controller 403 and the terminal-side display unit 404. Here, for example, the same screen as that described in the first embodiment is displayed on the terminal-side display unit 404 to notify the occupant of the host vehicle of the stop of the infrastructure cooperative operation. When the stop of the infrastructure cooperative operation is notified, the sequence of FIG. 8 is terminated.

According to the second embodiment of the present invention described above, the server 100A includes the notification information generator 108 that generates notification information for notifying the occupant of the host vehicle that the in-vehicle device 300 has started or stopped the cooperative operation with the infrastructure sensor 200. The notification information is transmitted from the server 100A to the user terminal 400 which is a portable terminal that the occupant of the host vehicle has (steps S1208 and S1213), and the user terminal 400 gives a notification to the occupant based on the notification information transmitted from the server 100A (steps S1304 and S1310). Thus, even if the in-vehicle device 300 does not include the vehicle-side display controller 305 and the vehicle-side display unit 306, it can notify the occupant of the host vehicle of having started or stopped the infrastructure cooperative operation.

In each of the embodiments of the present invention described above, an example in which the infrastructure sensor 200 is installed near the road has been described. However, a sensor that is not installed near the road may be used as the infrastructure sensor 200. For example, a sensor that can move in the air or on the ground arbitrarily or on a rail or the like within a predetermined movement range may be used as the infrastructure sensor 200, or an in-vehicle sensor of another vehicle may be used as the infrastructure sensor 200. Any sensor that can acquire its own position and sensing range can be used as the infrastructure sensor 200.

Each embodiment and various modifications described above are merely examples, and the present invention is not limited to these contents as long as the features of the invention are not impaired. Moreover, although various embodiments and the modifications are demonstrated above, this invention is not limited to these contents. Other embodiments conceivable within the scope of the technical idea of the present invention are also included in the scope of the present invention.

What is claimed is:

1. A server that performs control related to traveling support of a vehicle, the server comprising:
    an infrastructure management unit that holds infrastructure management information including a position and a sensing range of an infrastructure sensor that generates sensing information outside the vehicle;
    an infrastructure cooperation section determination unit that determines an infrastructure cooperation section indicating a range in which an in-vehicle device mounted on the vehicle performs a cooperative operation with the infrastructure sensor and performs traveling support of the vehicle based on the infrastructure management information held by the infrastructure management unit, wherein
        the server transmits cooperative operation information for the in-vehicle device to start or stop the cooperative operation with the infrastructure sensor to the in-vehicle device based on the infrastructure cooperation section determined by the infrastructure cooperation section determination unit,
        the infrastructure management information includes at least the position and the sensing range of each infrastructure sensor; and
    a notification information generator that is configured to generate notification information configured to provide a management screen that displays the infrastructure cooperation section determined for each vehicle on which the in-vehicle device is mounted for any vehicle.

2. The server according to claim 1, further comprising a vehicle cooperation unit having a communication function with the in-vehicle device, wherein
    the cooperative operation information is transmitted to the in-vehicle device by the vehicle cooperation unit.

3. The server according to claim 1, further comprising an infrastructure cooperation unit having a communication function with the infrastructure sensor, wherein
    the cooperative operation information is transmitted to the in-vehicle device via the infrastructure sensor by the infrastructure cooperation unit.

4. The server according to claim 1, further comprising:
    a vehicle cooperation unit having a communication function with the in-vehicle device; and
    an infrastructure cooperation unit having a communication function with the infrastructure sensor, wherein
    the server determines which of the vehicle cooperation unit or the infrastructure cooperation unit is used for transmission of the cooperative operation information based on a communication state with the in-vehicle device in the vehicle cooperation unit.

5. The server according to claim 1, wherein
    the cooperative operation information includes information on a position and a sensing range of each infrastructure sensor included in the infrastructure cooperation section.

6. The server according to claim 1, wherein
    the cooperative operation information includes information on a position and a sensing range of an infrastructure sensor existing in at least one of a start point and an end point of the infrastructure cooperation section.

7. The server according to claim 1, wherein
    the cooperative operation information includes information on at least one of a start point and an end point of the infrastructure cooperation section.

8. The server according to claim 1, further comprising a vehicle route generator that generates a route on which the vehicle should travel, wherein
    the infrastructure cooperation section determination unit determines the infrastructure cooperation section based on the infrastructure management information and the route generated by the vehicle route generator.

9. The server according to claim 1, wherein the notification information generator generates notification information for notifying an occupant of the vehicle that the in-vehicle device has started or stopped a cooperative operation with the infrastructure sensor, wherein
    the notification information is transmitted to the in-vehicle device or a portable terminal that the occupant has.

10. A vehicle control system, comprising:
    a server that performs control related to traveling support of a vehicle;
    an in-vehicle device mounted on the vehicle; and
    an infrastructure sensor capable of generating sensing information outside the vehicle, wherein
    the server includes:
    an infrastructure management unit that holds infrastructure management information including a position and a sensing range of the infrastructure sensor; and
    an infrastructure cooperation section determination unit that determines an infrastructure cooperation section indicating a range in which the in-vehicle device performs a cooperative operation with the infrastructure sensor and performs traveling support of the vehicle based on the infrastructure management information held by the infrastructure management unit,
    the infrastructure sensor includes:
    an infrastructure position acquisition unit that acquires a position of the infrastructure sensor;

a sensor unit that generates sensing information within the sensing range based on the position of the infrastructure sensor;

an infrastructure-side server cooperation unit that transmits information representing the position and the sensing range of the infrastructure sensor to the server; and an infrastructure-side vehicle cooperation unit that transmits the sensing information generated by the sensor unit to the in-vehicle device, the in-vehicle device includes:

a mode setting unit that sets or cancels a cooperative operation mode for performing a cooperative operation with the infrastructure sensor;

a vehicle-side infrastructure cooperation unit that acquires the sensing information transmitted from the infrastructure sensor when the cooperative operation mode is set;

a determination unit that determines an operation of the vehicle using the sensing information acquired by the vehicle-side infrastructure cooperation unit; and a vehicle controller that controls the vehicle based on a determination result of the operation of the vehicle by the determination unit, the server transmits cooperative operation information for the in-vehicle device to start or stop the cooperative operation with the infrastructure sensor to the in-vehicle device based on the infrastructure cooperation section determined by the infrastructure cooperation section determination unit, the in-vehicle device sets or cancels the cooperative operation mode by the mode setting unit based on the cooperative operation information transmitted from the server, and the server includes a notification information generator that generates notification information for providing a management screen capable of displaying the infrastructure cooperation section determined for each vehicle on which the in-vehicle device is mounted, for any vehicle.

11. The vehicle control system according to claim 10, wherein the server includes a vehicle cooperation unit having a communication function with the in-vehicle device, and the cooperative operation information is transmitted from the server to the in-vehicle device by the vehicle cooperation unit.

12. The vehicle control system according to claim 10, wherein the server includes an infrastructure cooperation unit having a communication function with the infrastructure sensor, and the cooperative operation information is transmitted from the server to the in-vehicle device via the infrastructure sensor by the infrastructure cooperation unit.

13. The vehicle control system according to claim 10, wherein the server includes a vehicle cooperation unit having a communication function with the in-vehicle device, and an infrastructure cooperation unit having a communication function with the infrastructure sensor, and the server determines which of the vehicle cooperation unit or the infrastructure cooperation unit is used for transmission of the cooperative operation information based on a communication state with the in-vehicle device in the vehicle cooperation unit.

14. The vehicle control system according to claim 10, wherein the cooperative operation information includes information on a position and a sensing range of each infrastructure sensor included in the infrastructure cooperation section.

15. The vehicle control system according to claim 10, wherein the cooperative operation information includes information on a position and a sensing range of an infrastructure sensor existing in at least one of a start point and an end point of the infrastructure cooperation section.

16. The vehicle control system according claim 10, wherein the cooperative operation information includes information on at least one of a start point and an end point of the infrastructure cooperation section.

17. The vehicle control system according to claim 10, wherein the server includes a vehicle route generator that generates a route on which the vehicle should travel, and the infrastructure cooperation section determination unit determines the infrastructure cooperation section based on the infrastructure management information and the route generated by the vehicle route generator.

18. The vehicle control system according to claim 10, wherein the notification information generator generates notification information for notifying an occupant of the vehicle that the in-vehicle device has started or stopped a cooperative operation with the infrastructure sensor, the notification information is transmitted from the server to the in-vehicle device, and the in-vehicle device gives a notification to the occupant based on the notification information transmitted from the server and a setting state of the cooperative operation mode by the mode setting unit.

19. The vehicle control system according to claim 10, wherein the notification information generator generates notification information for notifying an occupant of the vehicle that the in-vehicle device has started or stopped a cooperative operation with the infrastructure sensor, the notification information is transmitted from the server to a portable terminal that the occupant has, and the portable terminal gives a notification to the occupant based on the notification information transmitted from the server.

* * * * *